Dec. 3, 1929.  W. C. STEVENS  1,738,505
MACHINE FOR MAKING HOLLOW BASE TIRES OR OTHER RUBBER ARTICLES
Filed May 11, 1927    2 Sheets-Sheet 1
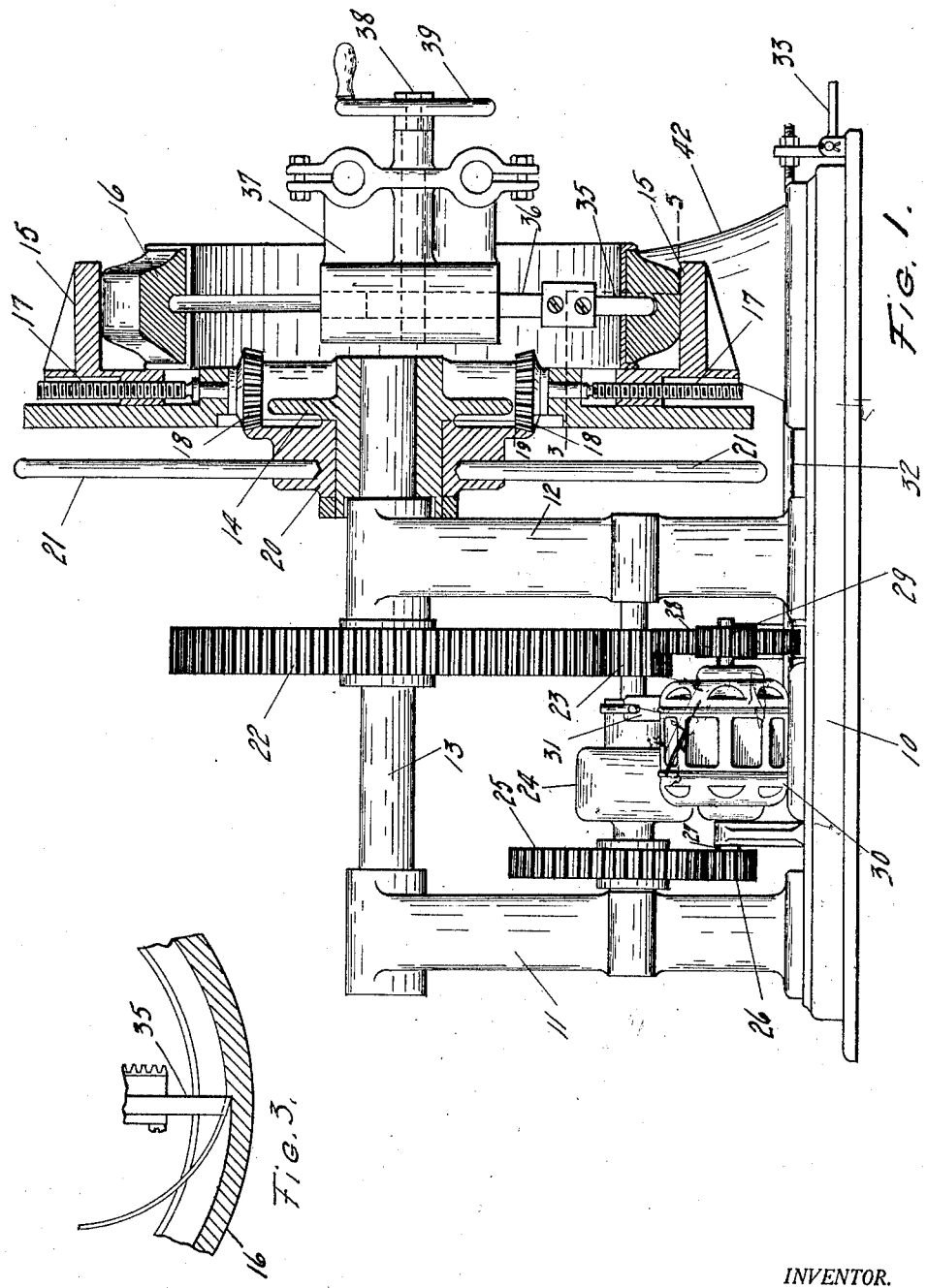
INVENTOR.
WILLIAM C STEVENS.
BY Ely & Barrow
ATTORNEYS.

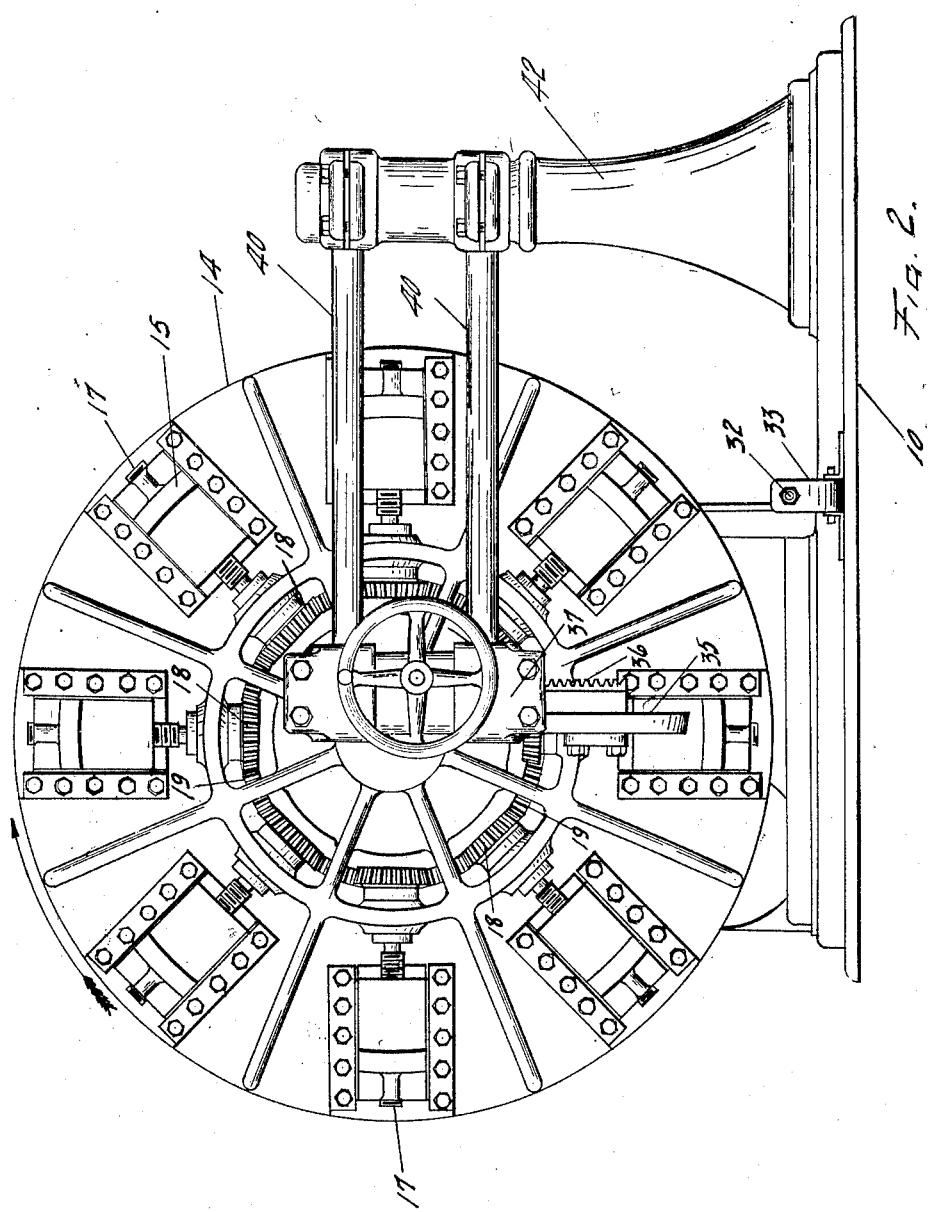

Patented Dec. 3, 1929

1,738,505

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

MACHINE FOR MAKING HOLLOW-BASE TIRES OR OTHER RUBBER ARTICLES

Application filed May 11, 1927. Serial No. 190,523.

This invention relates to machines for gouging grooves or the like in rubber articles, such as tires.

The general purpose of the invention is to provide improved means for forming grooves in rubber articles, especially prior to vulcanization.

In particular, the invention is directed to the combination with means for supporting and circumferentially driving a tire, of means for cutting a groove in the tire, for example, to form the tire to a "hollow base" section prior to vulcanization thereof.

The foregoing and other objects are obtained by the device illustrated in the accompanying drawings and described below. It is to be understood that the invention is not limited to the particular form thereof shown, nor to the particular use set forth.

Of the accompanying drawings,

Figure 1 is a side elevation, partly in section, of apparatus embodying the invention;

Figure 2 is an end elevation thereof; and

Figure 3 is a detail section on line 3—3 of Figure 1.

Referring to the drawings, the numeral 10 represents a support on which is provided standards 11 and 12 in which is journaled a shaft 13 having secured thereon a chuck 14 provided with jaws 15 adapted to receive a tire 16 therebetween to support and circumferentially drive the tire. Jaws 15 are adjusted by means of screws 17, 17 provided with bevel gears 18, 18 meshing with a bevel gear 19 on a collar 20 journaled on chuck 14 and rotatable by handles 21, 21.

To drive a chuck 14, the shaft 13 has a gear 22 thereon meshed with a gear 23 driven through a clutch 24 by a gear 25 in turn driven by a gear 26 on a shaft 27 which has another gear 28 thereon meshing with a pinion 29 on the shaft of a motor 30. Clutch 24 is arranged to be controlled by a yoke arm 31 operable by a rod 32 connected to a bell-crank pedal lever 33.

The tire forming tool comprises a loop cutter 35 mounted on the lower end of a rack 36 vertically movable in a tool carrier 37 by means of a pinion (not shown) on shaft 38 operable by a hand wheel 39. The tool carrier 37 is arranged to swing into a position within the periphery of tire 16 (Figure 1) by provision of supporting arms 40 for the carrier which are swiveled on a standard 42 (Figure 2).

The cutter 37 comprises a strip of metal bent to U-shape, as shown, to cut a groove of the desired width, the cutter being beveled upwardly from the point of cutting to provide a clearance, the cut material passing freely through the loop of the cutter.

In use, a tire 16 is mounted in chuck 14, the tool carrier 37 being swung out of the way for this purpose. The clutch 24 is then engaged, thus circumferentially driving the tire 16 and carrier 37 is swung into the position shown in Figure 1. A suitable stop (not shown) may be provided to position the carriage centrally of the tire. Tool 35 is then fed downwardly progressively to take a cut of the desired depth, the rubber as it is cut away passing through the loop of the knife out of the groove.

Modifications of the invention may be resorted to without departing from the spirit thereof or the scope of the appended claim.

What is claimed is:—

A device of the class described, said device comprising, in combination, means for supporting and circumferentially driving a rubber tire, a tool carrier movable within the periphery of said tire, a tool on said carrier, said tool comprising a loop-shaped cutter for gouging an annular groove in the inner periphery of the tire to form a hollow base therein, the loop of the cutter providing a space through which the rubber being cut away can pass out of the groove, and means for feeding the cutter radially of the tire.

WILLIAM C. STEVENS.